US005775667A

United States Patent [19]

Tassic

[11] Patent Number: 5,775,667

[45] Date of Patent: Jul. 7, 1998

[54] MOTORIZED ENGINE STAND

[76] Inventor: Wayne T. Tassic, 3230 N. Glenn Rd., Bourbonnais, Ill. 60914

[21] Appl. No.: 690,356

[22] Filed: Jul. 26, 1996

[51] Int. Cl.$^6$ .......... F16M 1/00

[52] U.S. Cl. .......... 248/676; 248/652; 269/17

[58] Field of Search .......... 248/652, 637, 248/641, 646, 671, 672, 673, 676, 677, 678; 269/17; 73/118.1

[56] References Cited

U.S. PATENT DOCUMENTS 3,538,759 11/1970 Schrom .......... 73/116
4,466,294 8/1984 Bennington .......... 73/862.13
4,848,717 7/1989 Bevill .......... 248/670
5,515,712 5/1996 Yunick .......... 73/9

*Primary Examiner*—Ramon O. Ramirez
*Assistant Examiner*—Gwendolyn W. Baxter
*Attorney, Agent, or Firm*—Baker & Daniels

[57] ABSTRACT

A stand for positioning an engine such as for assembly or repair. The stand has an enclosure supported by a base which houses a motorized drive mechanism employed to rotate a shaft carrying a mount adapted for securement to the engine. The stand also includes a braking assembly employed to stop rotation of the shaft for selectively positioning the engine relative to the stand when secured to the mount.

10 Claims, 5 Drawing Sheets

MOTORIZED ENGINE STAND

The present invention relates to a motorized mount for positioning an engine such as for assembly or repair.

BACKGROUND OF THE INVENTION

Engines, such as vehicular engines, are often most easily assembled, repaired or otherwise attended to when removed or detached from the vehicle chassis. Conventional mechanisms have been devised to support the dismounted engine during such assembly or repair. These mechanisms typically employ either a stationary stand which holds the engine in an upright position a predetermined distance above the working surface, or a chain or winch mechanism which suspends the engine above the working surface. Some such mechanisms thus advantageously permit access to the bottom and sides of the engine. Other conventional mechanisms permit the engine to be rotated in one direction about its axis without precise control over the stopping position of the engine.

Conventional mechanisms are undesirable because they lack adjustability. At best, winch type engine stands allow the engine to be raised and lowered. A related problem is safety. Since conventional engine mounts do not rotate the engine, access to the underside of the engine can be particularly inconvenient and dangerous. Often, mechanics must assume an undesirable posture to reach engine components located on the underside of the engine, or even position themselves directly under the engine creating obvious safety risks. Even conventional mechanisms which provide rotatable adjustment do not permit precise engine positioning or control over rotation direction.

SUMMARY OF THE INVENTION

The present invention provides a motorized engine mount or stand which controllably rotates and controllably stops the rotation of a dismounted engine connected to it so that all sides of the engine can be reached easily from a safe, convenient, standing or sitting position. The stand includes a motor mechanism mounted to a support frame supported by a base. The motor mechanism includes a shaft to which mounting arms are fastened. The dismounted engine is attached to the mounting arms. A braking assembly is mounted to the frame and stops or slows shaft rotation and thus, engine rotation. Actuation of the motor mechanism, which rotates the engine either forward or backward, and control of the braking assembly are responsive to the stand user.

Accordingly, it is an object of the present invention to provide an engine stand which provides controlled, rotational adjustability of a dismounted engine supported above the working surface to ease engine assembly, repair or maintenance.

BRIEF DESCRIPTION OF THE DRAWINGS

The above-mentioned and other objects and advantages of this invention, and the manner of attaining them, will become more apparent and the invention will be better understood by reference to the following description of embodiments of the invention taken in conjunction with the accompanying drawings, wherein.

Figure 1:
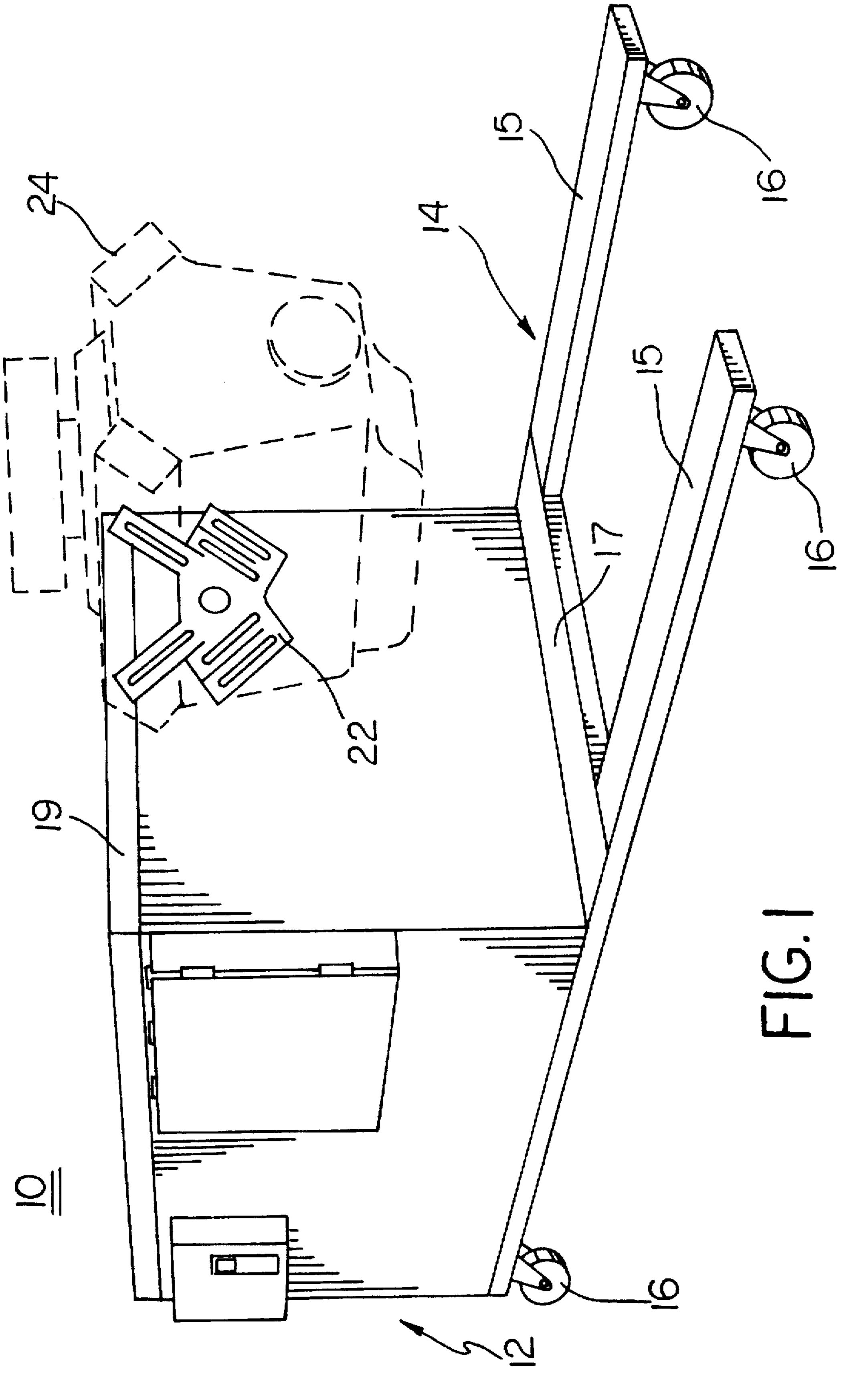
FIG. 1 is a perspective view of the motorized engine stand of the present invention with a dismounted engine shown in broken lines attached to the stand.

Corresponding reference characters indicate corresponding parts throughout the several views. Although the drawings represent an embodiment of the present invention, the drawings are not necessarily to scale and certain features may be exaggerated in order to better illustrate and explain the present invention.

DESCRIPTION OF THE INVENTION

The embodiments disclosed in the detailed description below are not intended to be exhaustive or to limit the invention to the precise forms disclosed. Rather, the embodiments selected for the description are disclosed so that others skilled in the art may utilize its teachings.

Figure 2:
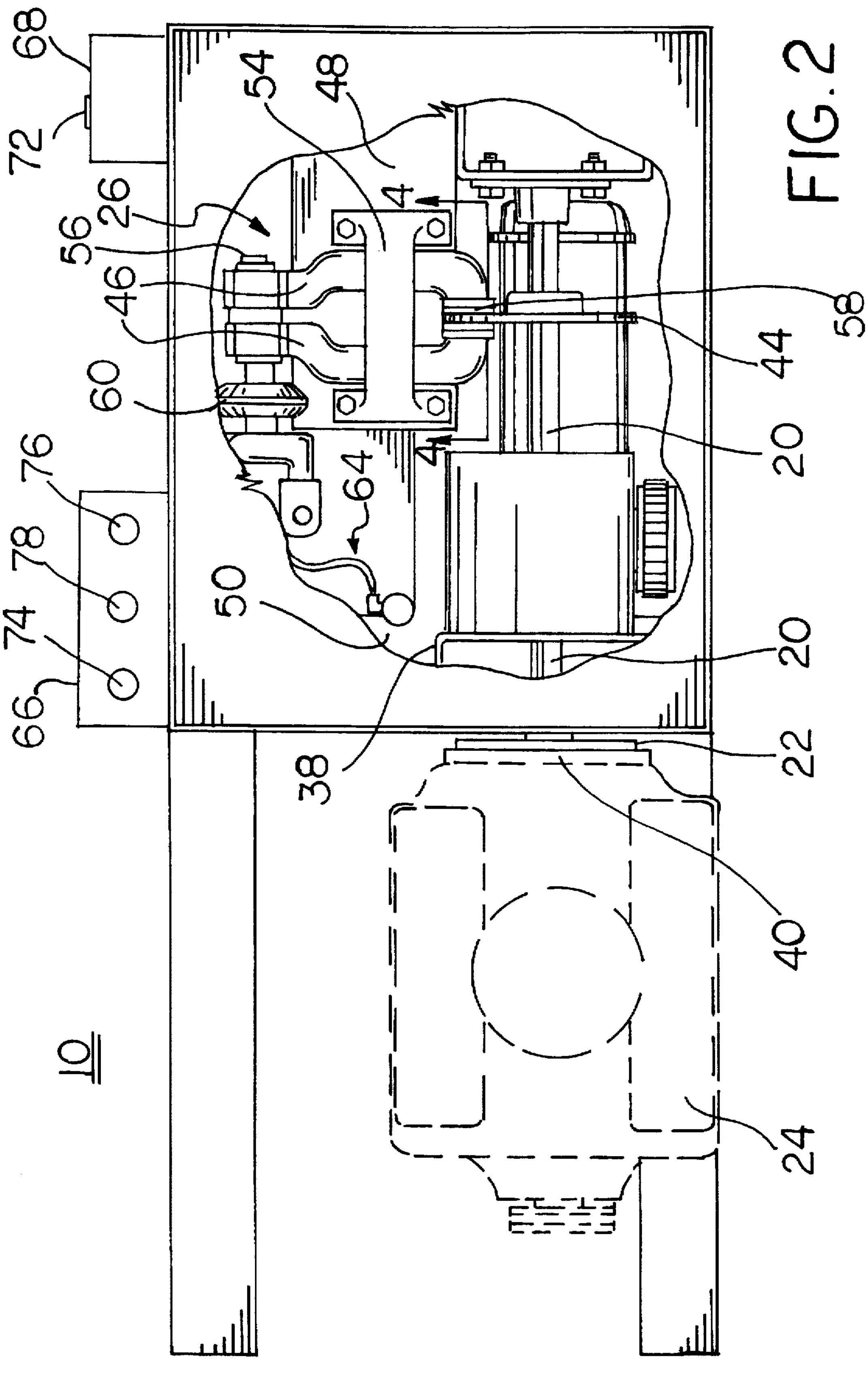
FIG. 2 is a partially fragmented, top plan view of the motorized engine stand of the present invention.
Figure 3:
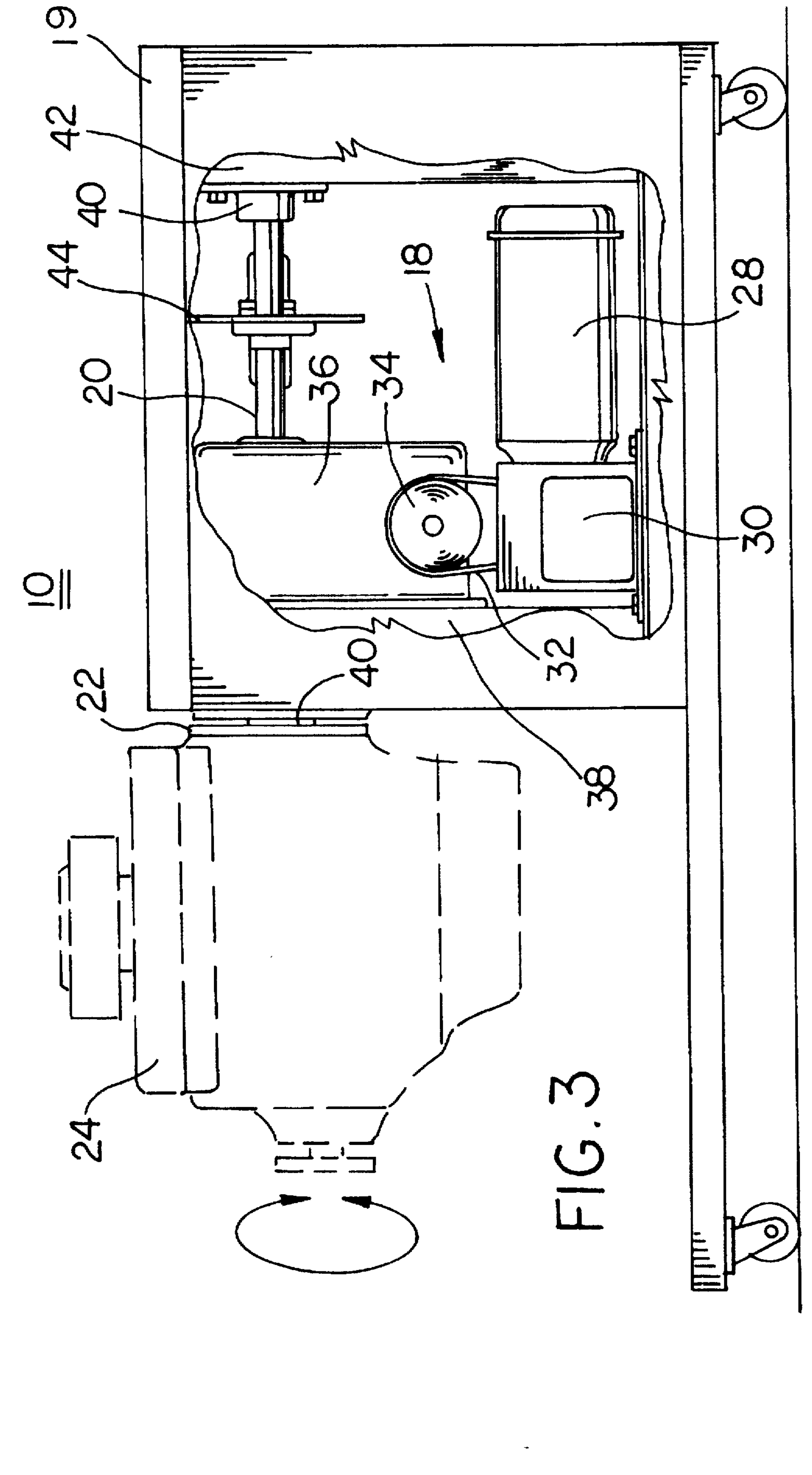
FIG. 3 is a partially fragmented, elevational view of the motorized engine stand.
Figure 4:
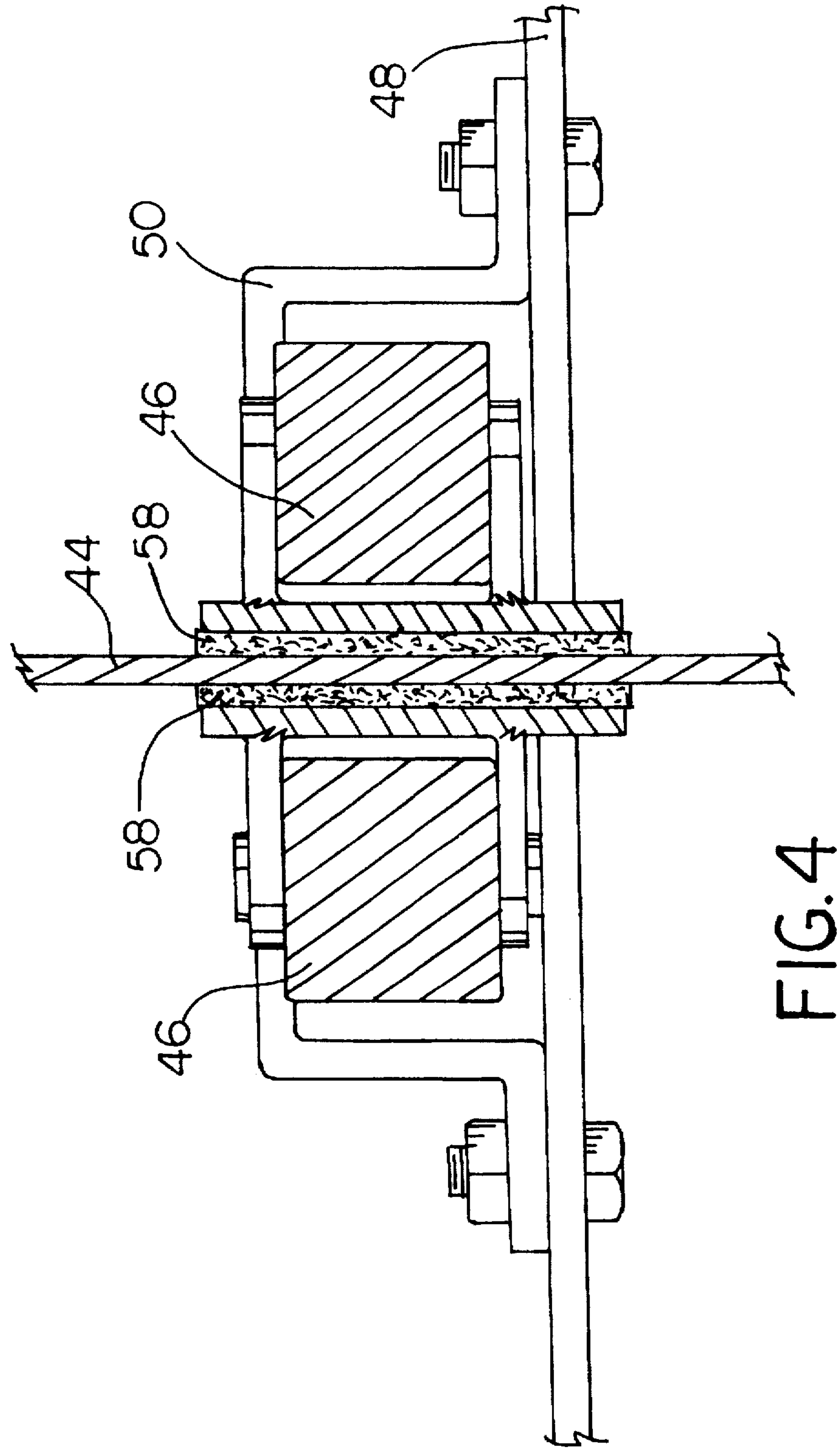
FIG. 4 is a fragmented, cross-sectional view of the braking assembly of the present invention taken along line 4—4 of FIG. 2.

FIG. 1 shows the motorized engine stand 10 of the present invention which includes housing 12 mounted on top of a platform or base frame 14 which, in an exemplary embodiment, includes spaced, parallel rails 15 connected together with cross bracing 17. Rails 15 also include rollers or wheels 16 for portability. As shown in FIGS. 2 and 3, housing 12, which may be formed of sheet metal or like material, houses a motorized drive mechanism 18 which is connected to an external engine mounting plate 22, and a braking assembly 26. Mounting plate 22 includes adjustable arm parts for bolted connection to the engine block. Motorized drive mechanism 18 includes a motor 28, a transfer gear box 30, and a reduction gear box 36. Motor 28 is connected to transfer gear box 30 by which rotational shaft movement of the motor is converted to a belt drive 32. Belt drive 32 is connected to gear box 36 where the belt drive speed is appropriately reduced and outputted to a drive shaft 20. Reduction gear box 36 is mounted to a front support column 38 which extends vertically from frame 14 adjacent engine mounting plate 22. Motor 28 may be either electrical or pneumatic.

Drive shaft 20 extends from both ends of reduction gear box 36 and is supported by bearings 40 mounted to supporting walls 38 and 42 of the frame 14. A braking disk 44, forming a part of the braking assembly, is fixedly attached to drive shaft 20. As best shown in FIG. 2, braking assembly 26 includes opposed calipers 46 which are held in a substantially horizontal position between a support plate 48, which is a part of frame 14, and an overlying bracket 54. Bracket 54 is attached to support plate 48 to retain calipers 46 in position relative to disk 44. Calipers 46 extend from an actuator bar 56 and straddle disk 44. Brake pads 58 are carried at the end of calipers 46. Calipers 46 are spread by solenoid 60 in a manner well known to those skilled in the art from a pressurized, normally closed position wherein pads 58 are in frictional engagement with braking disk 44, to an open position wherein pads 58 are spaced away from braking disk 44. Solenoid 60 is pneumatically activated from an air supply through tubing 64 flow connected to the solenoid 60.

A control box 66 and a fusebox 68 are attached exteriorly to housing 12. Fusebox 68 is routed to a suitable power source. A switch 72 powers control box 66 which includes a direction switch 74, which is a standard three-position switch having a center bias, a jog button 76, which is a standard two-position, momentarily on push button, and an emergency stop button 78, which is a standard two-position switch. Fusebox 68 provides supply voltage (+V) through power switch 72 in a standard manner.

Figure 5:
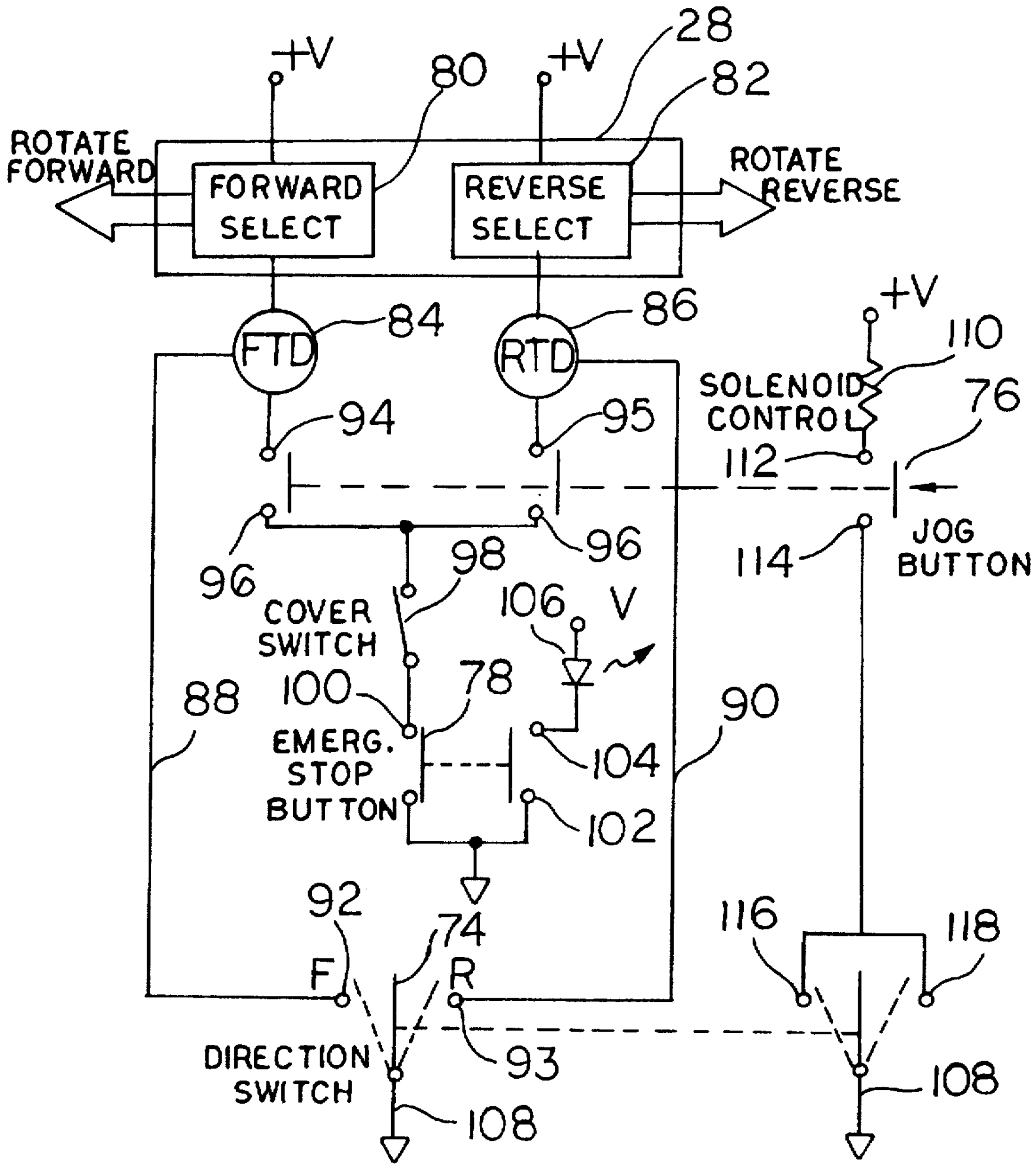
FIG. 5 is a schematic diagram of the engine stand controls.

Referring now to FIG. 5, motor 28 is depicted as having a forward select signal 80 for causing motor 28 to generate rotational torque in one direction and a reverse select signal 82 for causing motor 28 to generate rotational torque in an opposite direction. Forward select signal 80 is connected to forward time delay 84 which is enabled by direction switch 74 across line 88 when direction switch 74 is positioned so that forward switch node 92 is connected to ground at switch node 108. The output of forward time delay 84 is connected to an input 94 of jog button 76. Similarly, reverse select signal 82 is connected to reverse time delay 86 which is enabled by direction switch 74 across line 90 when direction switch 74 is positioned so that reverse switch node 93 is connected to ground at switch node 108. The output of reverse time delay 86 is connected to another input 95 of jog button 76. Output 96 of jog button 76 is connected across a cover switch 98 to input 100 of emergency stop button 78. Cover switch 98 is triggered or opened when access door 19 of housing 12 is opened by the stand user. Output 102 of emergency stop button 78 is connected to ground. Input 104 of emergency stop button 78 is connected to stop indicator 106 which is connected to supply voltage (+V).

Control to solenoid 60 is depicted in FIG. 5 as solenoid control 110 which is connected between supply voltage (+V) and input 112 to jog button 76. Output 114 of jog button 76 is connected to inputs 116,118 of direction switch 74.

Mode of Operation

Once a dismounted engine 24 is attached to engine mounting plate 22, the operator can rotate the engine about the axis of drive shaft 20 by manipulating the controls at control box 66. The operator selects the direction of rotation by holding direction switch 74 in either the forward or reverse position. For explanation purposes, assume the operator desires forward rotation of the engine 24. The operator holds direction switch 74 in its forward position against the switch bias to return to a neutral, center position as shown in FIG. 5. When in the forward position, inputs 92 and 116 of direction switch 74 are connected to ground, and forward time delay 84 is enabled across line 88. If the operator also depresses jog button 76, input 94 becomes connected to output 96 and input 112 becomes connected to output 114. Assuming cover switch 98 is closed and emergency stop button 78 has not been depressed, output 96 has a direct path to ground which causes forward time delay 84, once enabled, to begin counting down the preset delay. The time delay associated with forward and reverse delays 84,86 is adjustable and ideally corresponds to the time required for solenoid 60 to bleed pressure sufficiently to move calipers 46 into an open position (approximately 0.5 seconds in an exemplary embodiment). During the time delay, when forward select signal 80 is not yet activated, solenoid control input 112 is connected to ground across jog button 76 and direction switch input 116. Consequently, solenoid 60 vents to atmosphere thereby moving calipers 46 into their open position wherein brake pads 58 are spaced away from braking disk 44. As such, shaft 20 is now free to rotate. As should be apparent from the above description, the operator must keep both hands at the control box on the direction switch 74 and the jog button 76, and thus, safely away from the dismounted engine, to cause the engine to rotate.

After the predetermined time delay has elapsed with calipers 46 in their open position, forward time delay 84 connects forward select signal 80 to input 94 of jog button 76. Since jog button 76 is depressed, cover switch 98 is closed, and emergency stop button 78 is in its normally closed position, forward select signal 80 is connected to ground. In response, forward select signal 80 causes motor 28 to generate rotational driving movement in the forward direction.

Obviously, the path from forward select signal 80 to ground can be uninterrupted in various ways. If direction button 74 is released to the center-biased, neutral position, forward time delay 84 will become disabled and open the circuit from forward select signal 80 to input 94. Likewise, if direction switch 74 is moved to the reverse position, forward time delay 84 will be disabled and reverse time delay 86 will begin counting the delay period. If jog button 76 is released, the path between forward select signal 80 and ground will be interrupted and forward select signal 80 will deactivate motor 28. Also, if the operator raises access door or cover 19, cover switch 98 will open and break the path to ground. Finally, if the operator depresses emergency stop button 74, input 100 is disconnected from ground and motor 28 will not be activated. Once depressed, emergency stop button 78 remains activated until manually replaced in its normally closed position. When activated, emergency stop button 78 connects input 104 to output 102 which connects a light emitting diode or indicator 106 to ground. Indicator 106 emits light which provides a visual indication to the operator that the power stand is disabled. As should be apparent from the foregoing, if the operator releases jog button 76, the connection between input 112 and output 114 breaks and solenoid 60 is activated to cause calipers 46 to move into the closed position. Likewise, if the operator releases direction switch 74, direction switch 74 returns to the center position which breaks the connection between solenoid control 110 and ground. Again, solenoid 60 is activated to move calipers 46 into the closed position, wherein pads 58 are closed against disk 44 to stop or prohibit rotation of shaft 20 of disabled motor 28.

Similarly, if main power switch 72 of fusebox 68 is switched into the "Off" position, power is removed from stand 10 which automatically disables motor 28. The air supply to solenoid 60 is provided by a separate source and continues to provide pressurized air to braking assembly 26 with solenoid 60 activated and with calipers 46 remaining in the closed position. If the path from forward select signal 80 to ground is not interrupted, motor 28 creates rotational torque to its shaft in the forward direction. This causes drive shaft 20 to rotate in the selected direction which, in turn, rotates engine mounting plate 22 and the dismounted engine 24 attached thereto.

The operator stops rotation of engine 24 by releasing jog button 76, releasing direction button 74, depressing emergency stop button, or lifting the cover 19 of housing 12 as explained above. Any of these actions disables motor 28 and enables braking assembly 26 at substantially the same time by activating solenoid 60. Once solenoid 60 is activated, air pressurizes solenoid 60 to thereby cause opposing calipers 46 to move toward one another until each pad 58 frictionally engages braking disk 44. With motor 28 being disabled, only the momentum generated by the rotation of the mounted engine 24 opposes the frictional braking force generated by the braking assembly 26. Depending upon the direction of rotation of braking disk 44, upon engagement with braking disk 44, calipers 46 are urged upwardly but held in a substantially horizontal position by bracket 50, or urged downwardly against support plate 48. As such, the rotation of drive shaft 20 is almost immediately stopped by braking assembly 26.

What is claimed is:

1. Stand for positioning an engine block for assembly, disassembly or repair of an engine comprising:

a frame including a base and a support framework mounted to said base;

motorized drive means mounted on said frame for turning said engine block relative to said frame, said drive means including a shaft, and a mounting member mounted for rotation with said shaft for coupling said engine block for rotation with the shaft, braking means for holding said shaft against rotation relative to said frame, and control means for starting and stopping the drive means to effect turning of the engine block said control means including means responsive to starting and stopping of the drive means for releasing the braking means when the drive means is started and for engaging the braking means when the drive means is stopped.

2. The stand of claim 1 wherein said braking means includes a disk attached to and extending radially outwardly from said shaft, said disk having opposite sides, opposed calipers, mounted to said frame and straddling said disk, each of said calipers carrying a brake pad, each of said brake pads frictionally engaging a side of said disk when said calipers are moved into a braking position.

3. The stand of claim 2 wherein said braking means is adapted for actuation by a pressurized air supply.

4. The stand of claim 1 wherein said motorized drive means includes a motor and a reducing gear means for receiving the rotational power of said motor and outputting a rotational output of lesser speed than said rotational power.

5. The stand of claim 4 further comprising transfer gear means, said motor being located below the level of said reducing gear means, said transfer gear means for inputting said rotational power from the motor to the gear reducing means.

6. The stand of claim 1 said control means for enabling said motorized drive means and controlling the direction of said rotational power, said braking means being normally disposed in a braking position, said control means causing said braking means to move to a release position to allow shaft rotation whenever said motorized drive means is enabled.

7. The stand of claim 6 wherein said support framework includes a covering which substantially encloses said motorized drive means and said braking means, said covering including an access panel moveable between an open position and a closed position, said panel being in operable association with a switch means in communication with said control means wherein when said panel is moved out of said closed position toward said open position, said switch means causes said control means to disable said drive means.

8. The stand of claim 1 wherein said base includes roller means for movement of said stand.

9. The stand of claim 1 wherein said support framework includes a front vertical support and a rear vertical support, said shaft being supported horizontally between said vertical supports.

10. The stand of claim 1 wherein said motorized drive means is pneumatically powered.

* * * * *